Figures 1, 2, 3:
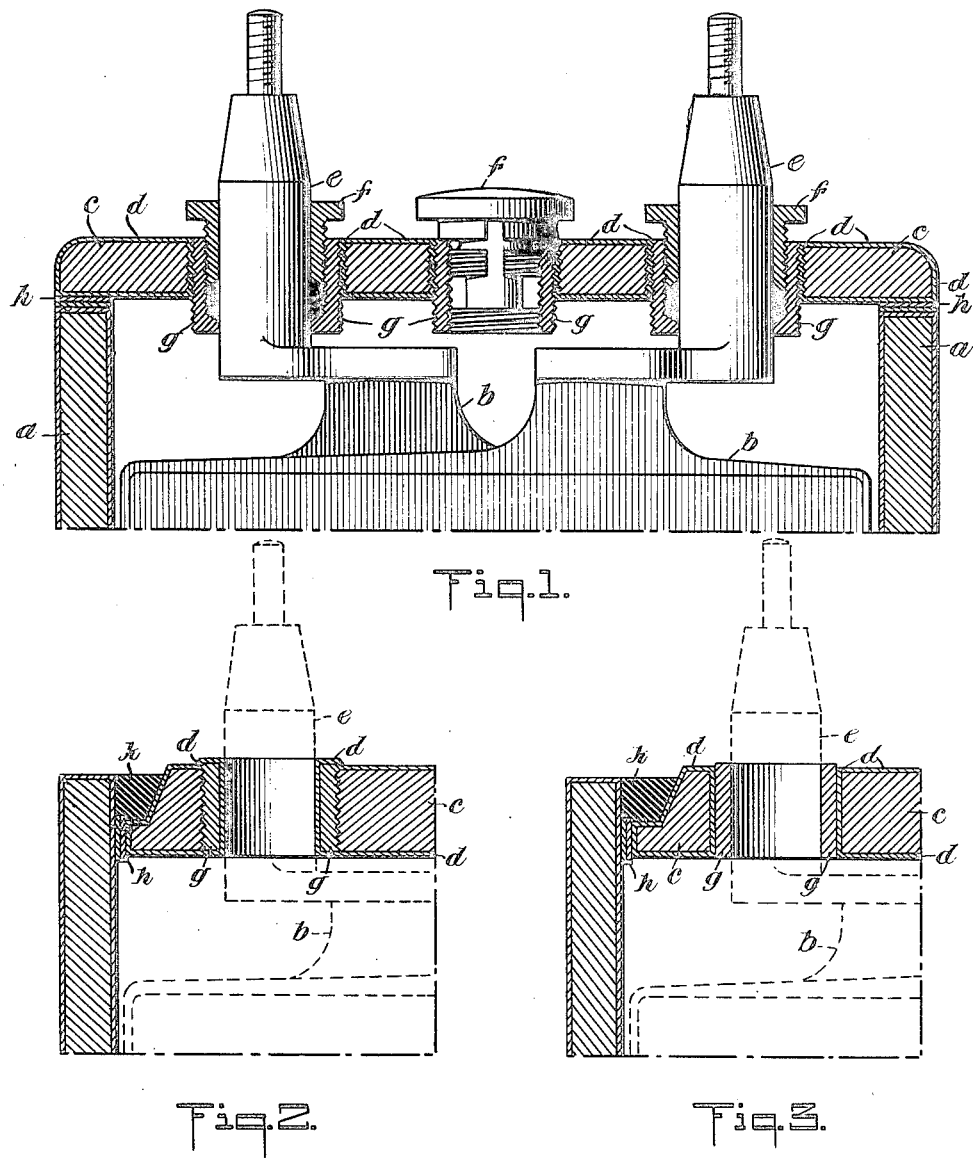

Nov. 20, 1923.

L. LYNDON 1,474,829

COVER FOR CONTAINING CELLS OF ELECTRIC BATTERIES

Original Filed Dec. 2, 1919

WITNESS

Lamar Lyndon INVENTOR

Patented Nov. 20, 1923.

1,474,829

UNITED STATES PATENT OFFICE.

LAMAR LYNDON, OF NEW YORK, N. Y.

COVER FOR CONTAINING CELLS OF ELECTRIC BATTERIES.

Application filed December 2, 1919, Serial No. 341,843. Renewed October 6, 1923.

*To all whom it may concern:*

Be it known that I, LAMAR LYNDON, a citizen of the United States, residing in the city of New York, county and State of New York, have invented certain new and useful Improvements in Covers for Containing Cells of Electric Batteries, of which the following is a specification.

This invention relates to covers for containing jars or cells for any form of electric battery, but finds its principal application to elements made of lead oxide immersed in dilute sulphuric acid, and has been developed more specifically with a view to obviating certain difficulties which now exist in the smaller sizes of storage battery cells, which are customarily made of hard rubber.

A specific application of this invention is that of the production of storage batteries for starting and lighting purposes on motorcars, but it is equally applicable to other types of batteries.

The main objects of this invention are to produce a cover for a battery container which will be durable, which will not be broken in removing from the containing cells, and which shall be low in first cost as compared with that of the present types of covers which are usually made of hard rubber or celluloid.

Further objects of this invention will hereinafter appear.

Briefly, this invention comprises the construction of a cover, for battery cells or containers, made of wood, having the desired dimensions, properly fabricated, and provided with the necessary openings through it for the cell terminals, gas vents, filler openings and such other holes or such configurations as may be necessary for the particular type of battery elements and the container in which they are placed.

This wooden cover is coated with a material which is liquid or plastic, which substance subsequently becomes hard, although it may retain a certain amount of resiliency. The coating is impervious to acid and forms ample protection for the wooden cover.

The cover itself may be made of boards, wood fibre, wood pulp, or any other convenient material, the basis of which is wood.

The drawings, herewith, illustrate the application of this invention. Figure 1 shows the upper portion of a vertical section taken transversely through a storage battery cell, while Figures 2 and 3 show the left hand portion of the upper part of a similar transverse section taken through the containing cell and cover only, the elements and terminal posts being indicated by the dotted lines.

In the figures, $a$ represents the upper portion of the container, $b$—$b$ the battery elements, $e$—$e$ the terminal posts, $c$ the wooden cover, and $d$ the acid-resisting coating.

The coating may be applied in any suitable manner, such as dipping, spraying, or with a brush. In order to obtain a sufficiently thick coating to give full protection to the wooden core, the cover will have to be dipped or brushed more than once, as a general rule. In order to keep the cost as low as possible, however, the thickness of the protective coating will be as small as good practice and experience prove to be admissible.

Such a thin coating will be subject to abrasion if continually subjected to rubbing, repeated pressures, or pounding. Therefore, it is desirable to re-inforce the openings in the cover where the terminal posts pass through it, and where the filler plug is inserted. Such re-inforcing sections of acid resisting material are shown at $g$ in the drawings. These may be of hard rubber, celluloid, or other suitable material.

If a thin cover is desired, the thickness of which is less than the length of the re-inforcing sleeves through which the posts $e$ pass, and in which the filler plug $f$ is inserted, the reinforcing tubes $g$ may be made longer than the cover thickness, as indicated in Figure 1. if the cover thickness be equal to the length of the cell cover openings, the construction may be as indicated in Figures 2 and 3.

Also, the re-inforcing tubes may be provided with outside screw threads which screw into mating threads in the holes through the cover, as indicated in Figures 1 and 2, or the re-inforcing tubes may be simply pressed into the openings or cemented therein, as indicated in Figure 3.

The cover may be first coated with the plastic acid resisting material and the re-inforcing tubes $g$ afterward inserted in the holes. In this case, the covering $d$ would surround the inner wall of the cover holes and the outer walls of the re-inforcing tubes would bear against the thin protective covering, instead of the wood itself. This method of construction is indicated in Figures 1 and 3. When made in this manner, the re-inforcing tubes may be placed in position, while the protective coating is still in a plastic state, so that when the latter hardens, the re-inforcing tubes will be cemented in place, or, if preferred, the protective coating may first be allowed to harden, and the re-inforcing tubes afterwards screwed or pressed, or otherwise fastened in position.

It, however, is not necessary to follow this procedure, but the re-inforcing tubes may first be fastened into the wooden core and the whole structure then dipped or sprayed, in which case a film of the protecting material will be formed on the inner wall of the re-inforcing tubes. This condition is shown in Figure 2.

The cover, when formed, may be attached to the containing cell in any desired manner; for instance, it may lie on the upper edges of the containing cell if the thickness through the wall of the latter is sufficiently great to afford a satisfactory bearing surface, and the cover cemented in place with any suitable cement which will join it to the upper edge of the containing cell. This method of construction is shown in Figure 1.

Also, the cover may be set inside the containing cell, the outer edges of the cover being sealed to the inner wall of the containing cell; or the cover may be joined to the containing cell by pouring in a plastic material which subsequently hardens, as indicated in Figures 2 and 3, in which both methods are shown, $k$ being the plastic material.

Since the protective covering is comparatively thin, it is desirable to re-inforce it on the surfaces which lie on, or abut against, the adjacent surface of the container, and for this reason, a considerably greater thickness of the protective coating material should be made on these parts of the cover. This localized increase in thickness may be produced either by additional dippings, spraying, or in any other manner, but I prefer to use a strip, or gasket, of material similar to that which forms the protective covering. Such gaskets are shown at $h$ in the figures.

An example of an acid resisting material which is liquid or plastic when first made, and which in this condition can be applied to the wood covering by spraying, dipping, or with a brush, and which subsequently hardens, forming an impervious, acid-resisting substance, is a material substantially comprising cellulose treated with a suitable acid which produces a chemical compound soluble in certain solvents and, when so dissolved and the solvent subsequently removed, leaves a substance corresponding, in its characteristics, to such materials as are known under the trade names of "celluloid", "pyralin" and the like. There are obviously several impermeable, acid-resisting materials which may be used in the manner and for the purpose described.

Without enumerating equivalents and variations, I claim as my invention:

1. A cover for containing cells of electric batteries comprising a wooden core coated with an impervious, acid-resisting film and provided with holes for terminals and filler openings, the walls of said holes being reinforced by a layer of an acid-resisting substance thicker than the film over the surfaces of said wooden core.

2. A cover for containing cells of electric batteries comprising a wooden core covered with an impervious, acid-resisting film and provided with holes for terminals and filler openings, the walls of said holes being reinforced by tubes of an acid-resisting substance.

3. A cover for containing cells of electric batteries comprising a wooden core covered with a film of an impervious, acid-resisting substance, said cover having a thicker layer of acid-resisting substance around the edges which are placed adjacent to the containing cell walls.

4. A cover for containing cells of electric batteries comprising a wooden core coated with an impervious, acid-resisting film, said cover being provided with a gasket of acid-resisting material around the edges which are cemented to the walls of the containing cells.

5. A cover for containing cells of electric batteries comprising a wooden core coated with an impervious, acid-resisting substance and provided with holes for terminals and filler openings, the walls of said holes being reinforced by a layer of an acid-resisting substance thicker than the coating over the surfaces of said wooden core and having a thicker layer of acid-resisting substance around the edges which are placed adjacent to the containing cell walls.

6. A cover for containing cells of electric batteries comprising a wooden core coated with an impervious, acid-resisting substance and provided with holes for terminals and filler openings, the walls of said holes being reinforced by tubes of an acid-resisting substance thicker than the coating over the surfaces of said wooden core and having a thicker layer of acid-resisting substance around the edges which are cemented to the walls of the containing cells.

7. A cover for containing cells of electric batteries comprising a wooden core coated with an impervious, acid-resisting substance and provided with holes for terminals and filler openings, the walls of said holes being reinforced by a layer of an acid-resisting substance thicker than the coating over the surfaces of said wooden core, said cover being provided with a gasket of acid-resisting material around the edges which are cemented to the walls of the containing cell.

8. A cover for containing cells of electric batteries comprising a wooden core covered with an impervious, acid-resisting substance and provided with holes for terminals and filler openings, the walls of said holes being reinforced by tubes of an acid-resisting substance, said cover being provided with a gasket of acid resisting material around the edges which are cemented to the walls of the containing cells.

9. A cover for containing cells of electric batteries comprising a wooden core coated with an impervious, acid-resisting substance which is applied while in a liquid or plastic state and is allowed to subsequently harden.

10. A cover for containing cells of electric batteries comprising a wooden core coated with a material which is substantially cellulose treated with an acid and dissolved in a suitable solvent, said material being allowed to subsequently harden.

In testimony hereof, I hereto subscribe my name.

LAMAR LYNDON.